United States Patent [19]

Novak

[11] Patent Number: 5,497,314
[45] Date of Patent: Mar. 5, 1996

[54] AUTOMATED APPARATUS AND METHOD FOR OBJECT RECOGNITION AT CHECKOUT COUNTERS

[76] Inventor: Jeffrey M. Novak, 4322 Collins Way, Lake Oswego, Oreg. 97035

[21] Appl. No.: 206,955

[22] Filed: Mar. 7, 1994

[51] Int. Cl.⁶ .................................................. G06F 153/00
[52] U.S. Cl. .................... 364/403; 235/383; 235/385; 382/110; 382/143; 382/203; 382/216
[58] Field of Search .................................... 364/400, 401, 364/402, 403, 404; 186/52, 56, 58, 59, 60–69; 235/383, 462, 385; 382/8, 1, 110, 111, 203, 143, 216, 294; 348/91, 150

[56] References Cited

U.S. PATENT DOCUMENTS

| | | | |
|---|---|---|---|
| 4,493,105 | 1/1985 | Beall et al. .................................. 382/21 |
| 4,676,343 | 6/1987 | Humble et al. ............................. 186/61 |
| 4,817,184 | 3/1989 | Thomason et al. ......................... 382/8 |
| 4,858,000 | 8/1989 | Lu ................................................. 348/2 |
| 4,929,819 | 5/1990 | Collins, Jr. ................................ 235/383 |
| 4,930,011 | 5/1990 | Kiewit . | |
| 4,939,355 | 7/1990 | Rando et al. ............................. 235/467 |
| 4,940,116 | 7/1990 | O'Connor et al. ....................... 186/61 |
| 5,019,694 | 5/1991 | Collins, Jr. ................................ 235/383 |
| 5,025,477 | 6/1991 | Baitz et al. .................................. 382/8 |
| 5,031,228 | 7/1991 | Lu ............................................... 382/38 |
| 5,033,101 | 7/1991 | Sood . | |
| 5,038,024 | 8/1991 | Chadima, Jr. et al. . | |
| 5,040,056 | 8/1991 | Sager et al. ................................. 348/88 |
| 5,041,907 | 8/1991 | Sager et al. ................................. 348/91 |
| 5,046,570 | 9/1991 | Emme et al. . | |
| 5,083,638 | 1/1992 | Schneider .................................. 186/61 |
| 5,115,888 | 5/1992 | Schneider . | |
| 5,134,661 | 7/1992 | Reinsch ......................................... 382/1 |
| 5,159,646 | 10/1992 | Kumagai .................................... 382/34 |
| 5,168,961 | 12/1992 | Schneider .................................. 186/52 |
| 5,191,749 | 3/1993 | Cappi et al. ............................... 53/502 |
| 5,208,870 | 5/1993 | Ennis ........................................... 382/30 |
| 5,243,665 | 9/1993 | Maney et al. ................................. 382/8 |
| 5,245,533 | 9/1993 | Marshall .................................. 364/401 |
| 5,252,814 | 10/1993 | Tooley et al. ............................ 235/383 |
| 5,253,302 | 10/1993 | Massen . | |
| 5,256,864 | 10/1993 | Rando et al. ............................ 235/462 |
| 5,331,544 | 7/1994 | Lu et al. .................................. 364/401 |

*Primary Examiner*—Gail O. Hayes
*Assistant Examiner*—Joseph Thomas
*Attorney, Agent, or Firm*—James C. Nemmers

[57] ABSTRACT

An automated check-out system for retail stores, such as supermarkets, employing digitized video signals and other means to determine and differentiate individual products, and thereby register the data for billing and inventory purposes. The sensors control the flow and positioning of retail items into the housing wherein the light source is regulated and controlled. Within the housing, optical imaging of the retail item is made with the electronic signal being digitized. By use of computerized databases, the digitized signal is compared to the finite set of data for products of approximately the same size, shape, weight and other comparative variables. Further confirmation of product identity is achieved by use of bar code differentiation, multiple image comparisons and, if necessary, optical display to the store personnel operating the cash register station serving multiple check-out lanes within the store. The customer is guided through the transaction by use of a video display screen. Once the items are registered, the customer then may bag the items and proceed to the centralized cashier station to complete the transaction.

20 Claims, 6 Drawing Sheets

AUTOMATED APPARATUS AND METHOD FOR OBJECT RECOGNITION AT CHECKOUT COUNTERS

BACKGROUND OF THE INVENTION

The present invention relates generally to systems and methods of digital image recognition for automatically identifying and categorizing products purchased in retail establishments, such as supermarkets, so that a consumer can "check-out" the purchased items without the need for store personnel to manually perform this task.

Various systems have been devised in an effort to automate product identification and thereby facilitate the check-out process in retail establishments, particularly food stores. Currently articles are checked out in a supermarket or other store by clerks who key a price that is marked on each object into an electronic cash register or other computerized inventory and register apparatus. In the more automated systems, clerks use a scanner to scan the UPC (or other) bar code on the item which results in a Point-of-Sale (POS) system determination of the price of the item based on an electronic data message which translates the bar code into a number that is unique to that item and correlates to a price in the database of the POS system. The scanning of bar codes on articles has allowed supermarkets to greatly speed up the process of entering data for the purchase of goods thereby lowering its labor costs, since prices are no longer required to be placed on each item and the check-out clerks are able to input data with more speed. While use of the scanning system has made the check-out process more efficient, it still requires a person to perform an act (scanning) to obtain the necessary data concerning the product(s) being purchased. The cost of this labor is rising and continues to represent the major operating expense to many retail establishments, particularly those involved in the high volume sale of products.

Previous attempts have been made at providing a comprehensive check-out system without the continual assistance of store personnel. In U.S. Pat. No. 4,676,343 for a "Self-Service Distribution System", a semi-automated supermarket check-out system is described. This system, however, requires use of a scanner system operated by the untrained customer with resultant delays in the check-out stations.

U.S. Pat. No. 4,939,355 for an "Automatic Package Label Scanner" discloses multiple laser scanners that read all sides of an item without involving the customer in the scanning process other than placing the items on a conveyor at the check-out station. This system, however, requires store personnel intervention to register products upon which there are no bar codes which can be as high as 30% in some supermarkets. Additionally, this highly complex system requires a substantial initial investment, and requires continual and expensive maintenance support.

U.S. Pat. No. 5,025,477, entitled a "Method for Optically Sensing Marks on Objects and Apparatus for Carrying Out the Method", represents a somewhat differing approach to reduce the amount of store personnel intervention in the check-out process by the use of multiple scanning sensors. In the event the system is unable to recognize and register an item passing through the check-out station during an initial scan, the item will make multiple passes through the scanning area and video cameras view the object for interpretation by store personnel.

None of the prior art systems or methods provide a relatively simple system for the automated check-out of retail items that is not dependent upon the involvement of customer or store personnel. Moreover, all the prior art systems rely principally upon bar code technology, and require a relatively expensive complex system, that is usually difficult to economically maintain. It therefore is an object of the present invention to overcome these deficiencies of the prior art systems and methods.

SUMMARY OF THE INVENTION

The present invention utilizes an unmanned check-out station to which the items to be processed are conveyed by any appropriate means. The items are placed on the conveyor by the customer, and are automatically conveyed into an enclosed housing containing an illumination source, weight differentiation means and video imaging equipment. Sensors are used to control the operation of the automatic conveyer. Digital image processing techniques and technology are used to identify the items by taking a digitized image of the object at a known focal point and illumination, and correlating it to the set of digitized images contained within the data base of the system.

By predefining the set of digitized images according to the possible random orientations in which the object may be presented to the video imaging camera digitizer, the need for precise orientation of the product to the conveying means of the apparatus is eliminated. By correlating the digital image of each object to additional identification characteristics of the item, a precise determination of proper identity is accomplished with a minimal error rate. This identification is made by computerized comparison to the digital image stored in the memory of the system. Alternatively, the identification can be made or confirmed by computerized analysis of the characteristics of the product (such as shape, weight, location of the bar code, size of the mil bar segments of the bar code, etc.) with and without the assistance of a controllable laser scanner.

DESCRIPTION OF PREFERRED EMBODIMENTS AND PRACTICES

Figure 1:
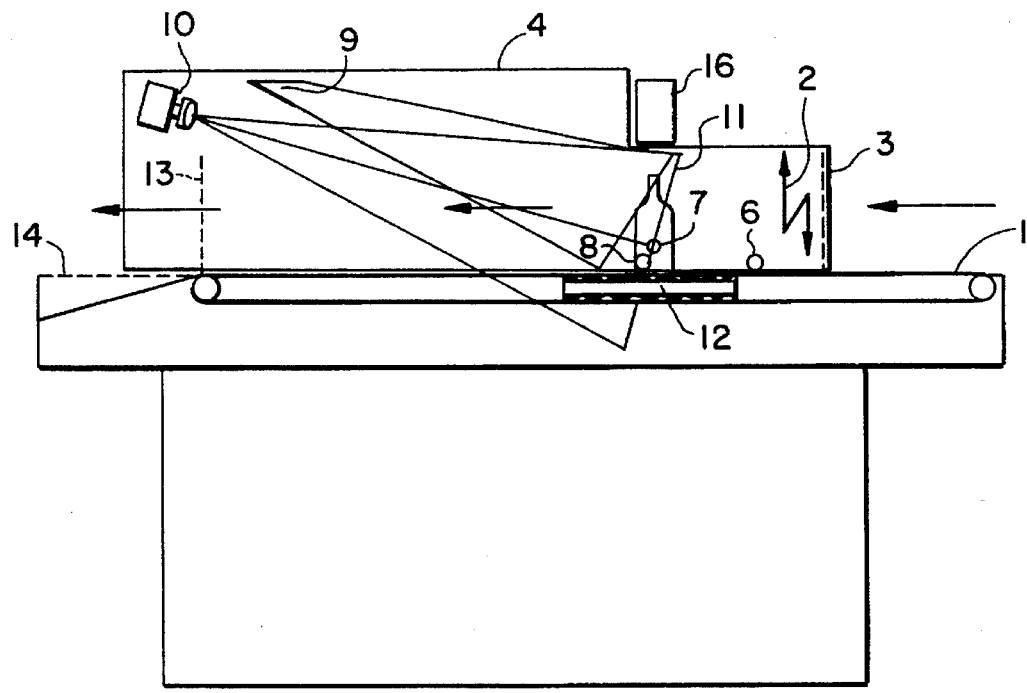
FIG. 1 is a schematic drawing showing a side elevational view of a typical supermarket or retail store check-out system in accordance with this invention.
Figure 2:
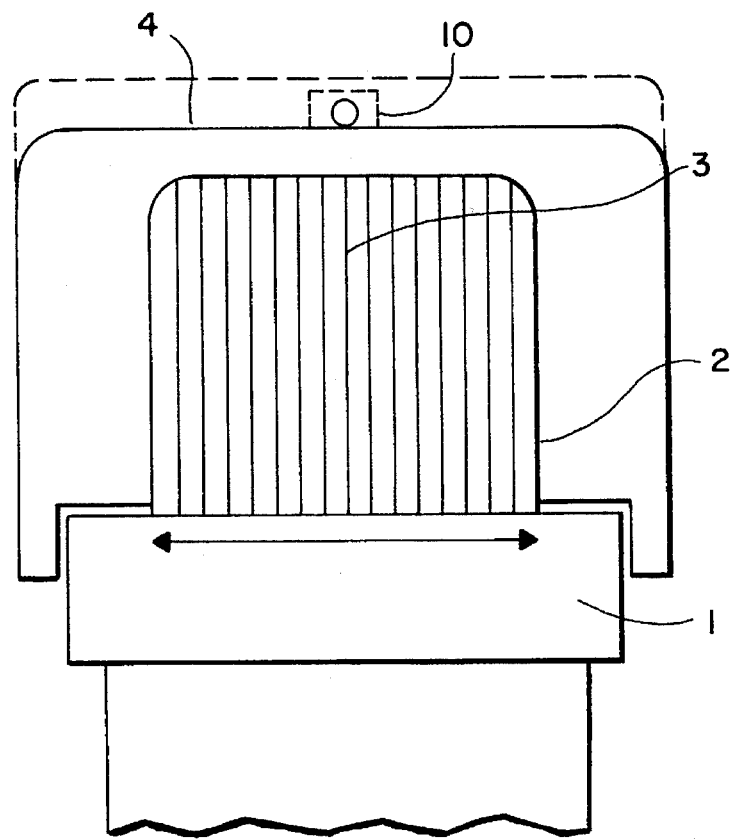
FIG. 2 is a schematic end elevational view of the input end of a check-out system into which the customer feeds the retail items to be identified utilizing the principles of the invention.
Figure 3:
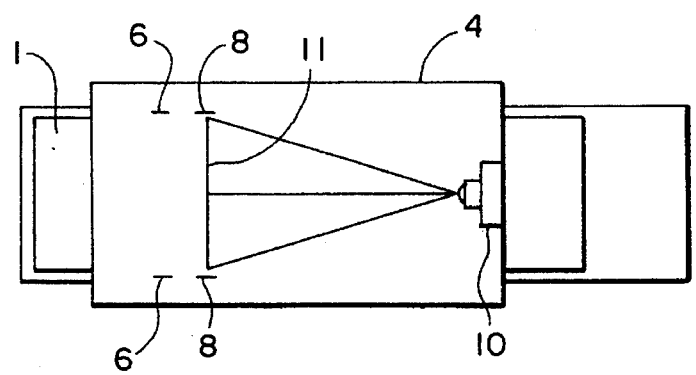
FIG. 3 is a schematic top view of a portion of the system and showing the digital video camera and illustrating its field of view within the housing of the automated check-out system comprising this invention.
Figure 4:
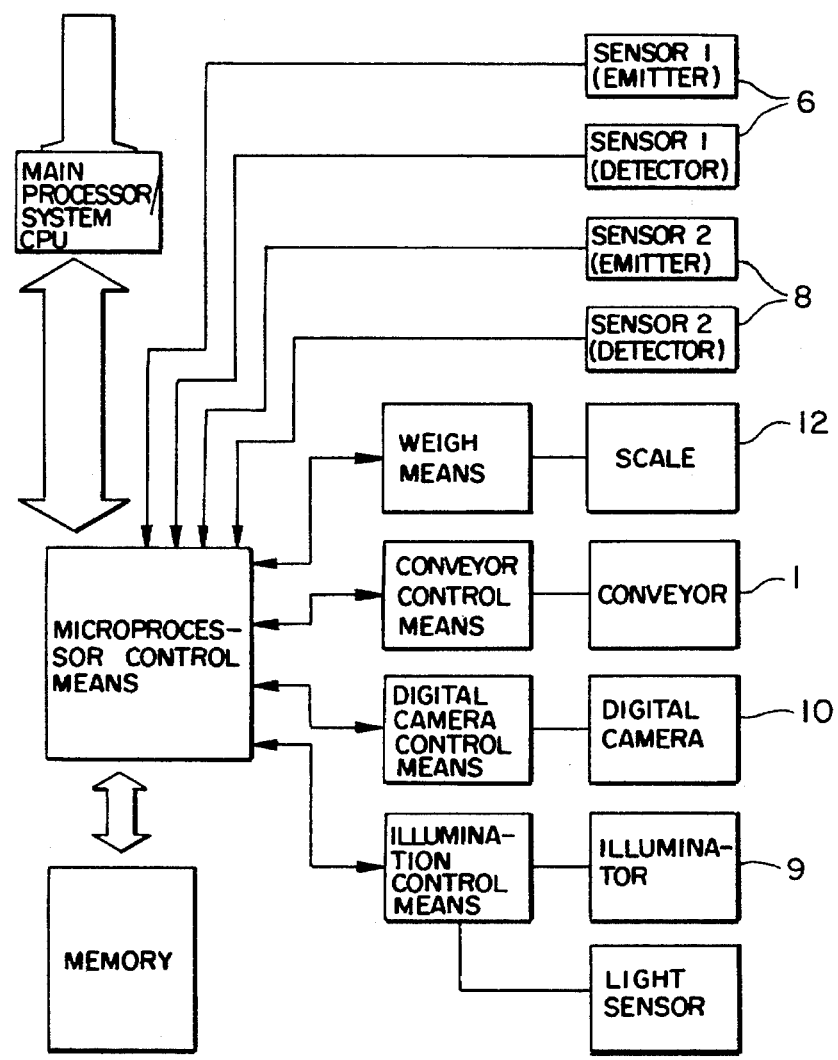
FIG. 4 is a block diagram illustrating the basic components of the system of the invention.

FIG. 1 shows a check-out system having a conveyor 1 upon which a customer places the objects to be purchased one at a time. The conveyor 1 transports the objects through an aperture 2 into a housing 4. It should be noted that the housing 4 is scaled in such a way that it may be used on a wide variety of belted checkstands as may be found in typical supermarkets or other retail establishments. Aperture 2 is covered by a light curtain 3 which consists of flexible, overlapping material hanging over the conveyor 1 and which controls the ambient light entering the housing 4. An illumination means 9 provides illumination within the housing 4 at a known value, and the colors within the enclosed area of housing 4 are controlled to minimize reflections and correlate consistently the background data of the image of the object to be identified.

After entering the housing 4, each object to be identified travels a short distance until a sensor 6, preferably comprising a laterally opposed emitter and detector, produces a signal to the control means (not shown) for the conveyor 1 to stop the object at a predetermined position within the housing 4. It is not essential to the invention to stop the conveyor 1 as long as an "unblurred" digital image of the object can be obtain. In either event, a second sensor (not shown) can be used if desired to increase the accuracy of the distance of travel of the object. The position where the object is stopped by sensor 6 is the focal point 7, and a photosensor 8 feeds a signal to a microprocessor (not shown) indicating the exact position of the edge of the object in relation to the focal point 7 as a function of the time elapsed since activation of sensor 6 and as a function of the known speed of conveyor 1.

A digital imaging camera 10 of a known focal length and field of view is positioned so that the object to be identified is now located within the focal plane 11 of the camera 10. The variables of focal length and illumination are now quantified, as is the focal plane 11. Therefore, a digital image that is unique to that object is captured within the digital camera 10. Additional feedback may be implemented by, for example, automatic focusing of the digital camera 10 to further control optical imaging variables, in particular any variation in the focal point 7. By controlling the optical imaging variables, and therefore capturing the image at a known focal length, the set of digital representations required to positively identify an object are limited, thereby reducing the number of digital representations required to represent different objects.

Figure 11:
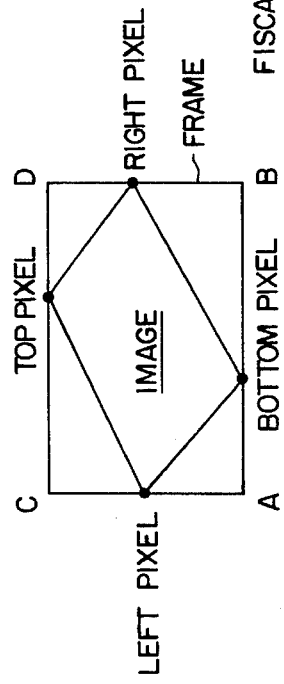
FIG. 11 is a pictorial image of a typical store item and showing the computerized system generated from the video camera so as to determine the calculated area of the item for the purpose of product identification.

The digital information regarding an object properly positioned in the housing 4 is imaged onto a two-dimensional charge coupled device (CCD) array, and the digital image created is encoded as a bit value and is directly associated to a pixel location. For example, the current image from video camera 10 might be a matrix of 284×376 pixel elements, each with a grayscale value of from 0 to 255. The amount of data handled can be reduced by determining where the active image is within the current image, removing background (extraneous) data and by translating the cartesian coordinates so that the image can be defined and matched against default definitions in the look-up files of the database of the microprocessor. This allows the boundaries of the image area to be created, and eventually allows the data fields in the current image record to be aligned with the look-up files. FIG. 11 illustrates an object to be identified the image of which is captured by the video camera 10. A frame image of ABCD is created as a first quadrant cartesian plane after the image boundary is determined with the top/bottom/left/right pixels. The frame image thus created is a subset of the current image and was created by finding the extreme points where image data is resident. That is, the system looks for the first outlying pixels where the pixel-grayscale value is greater than the pixel background value. Thus, by narrowing to the area where an image is located, the amount of data that must be used is minimized. In addition, several statistics can be calculated to provide further distinguishing information about the image and the frame which contains the image. These statistics may be but are not limited to the total number of pixels in the image, the total number of pixels in the image frame and the sum of the pixel values within the frame.

The range of precision is increased as the bit information available per pixel is increased. This data is sent to the microprocessor which identifies the specific object by comparing the coded information received to a controlled and calibrated set of predetermined objects that were encoded under equivalent conditions and stored in the database of the microprocessor.

To minimize the time of searching the database of the microprocessor containing the look-up files, additional parameters, such as the physical attributes of the object, may be used. One of the physical attributes that varies substantially from product to product is the product weight. As illustrated in FIG. 1, the weight of the object can be quickly and easily sensed by weighing means such as scale 12, as the object arrives at the focal point 7. The value of the weight thus sensed is then sent to the microprocessor. By organizing the numerous objects encoded in the look-up files of the database into groups by weight, the proper group only need to be searched to find the digital representation of the object to be identified.

Other physical attributes from additional sensors in the system may be used in a similar fashion to create more subsets of the database to further differentiate items, thereby increasing the probability of matching correctly. However, the cost of the additional sensors must be balanced against the cost saving resulting from increased speed and the ability of the microprocessor to differentiate products. Some additional sensors that might be considered include magnetic, spectral and sonar sensors.

Figure 13:
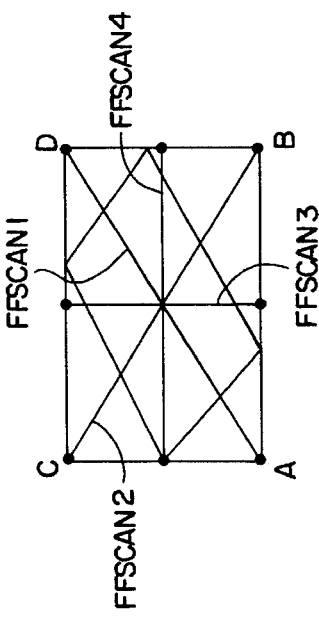
FIG. 13 is a pictorial image similar to FIGS. 11 and 12 but showing the frame scan lines used in the product identification.
Figure 12:
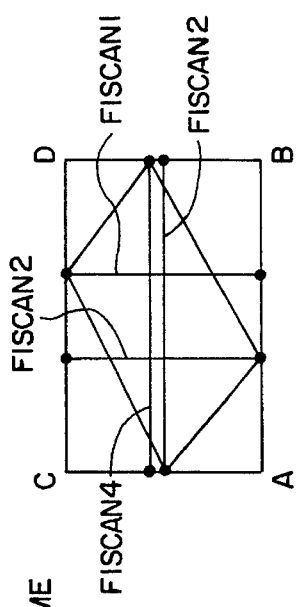
FIG. 12 is a pictorial image similar to FIG. 11 but showing the image scan lines used in the product identification.

In order to positively identify the object, the data obtained from the image frame (see FIG. 11) and the data regarding the weight of the object obtained from the scale 12 (if used) are transmitted to the microprocessor containing in its database the look-up files. This data is then compared with the set of look-up items with similar characteristics. The number of records in the database which must be checked are minimized by eliminating those records which do not share the calculated and physical attributes of the current image. Further, the comparison is then made to determine if there is a correlation between the number of rows and columns in the image, if there is there a correlation in the total number of pixels in the image or if the sum of the pixel values is correlated. The microprocessor then creates a two-dimensional array of image record numbers for those items in the look-up record that meet all of these criteria. Additional correlation data for each record may be collected. If no match is made at this point, a comparison is then made using the scan lines of the current image with the subset of item image record scan lines as illustrated in FIG. 12 to see if there is a subset of item look-up records that share the same characteristics as the current image. This is accomplished by subtracting the pixel values for the scan lines of the current item with the equivalent scan lines of the subset of items. To narrow the subset even further until we get a match, the frame scan lines as illustrated in FIG. 13 can be used. The values of the pixel subtractions are stored in the two-dimensional array as well as the sum of the resultant pixel subtractions for all pixel values in the scan line. In addition, additional statistics about the distribution of pixel values that result from the subtraction of scan lines are captured. These statistics include, but are not limited to, the mean, median, standard deviation, range, skew and kurtosis of the distribution. The same calculations and statistics could be made on the entire set of pixels in an image if the speed and cost are not an object. If ultimately no match is made, a message to a "checker" (or consumer) with the current image and the images of the subset of items we have narrowed can be displayed in order for them to visually choose the correct item from the choice of images with associated product names that have been provided to them. These occurrences should be infrequent and could arise from several causes, including two items inadvertently placed on the conveyor, internal timers exceeding their default values or items not having an item record in the database. However, it is desirable to track them in the software so that the software and database can be fine tuned to improve the matches.

After the object is identified by the system of the invention, the microprocessor produces a signal to restart the conveyor 1 so as to move the object through the focal plane 11, beyond the focal point 7 and outside the housing 4. As it exits the housing 4, the object passes through a second light curtain 13 which serves to control the ambient light within the housing means 4.

The conveyor 1 may end at this point or extend from the housing 4 to a take-away area 14 that serves as a transition to carry the objects from the conveyor 1 to a bagging area where the customer can package the objects before leaving the store. As soon as the object is identified and therefore "known," a look-up record, representing data which identifies that object, is electronically sent to the POS system denoting, but not limited to, for example, the UPC number of the item. The conveyor 1 is then restarted and the next object placed on the belt is conveyed into the housing 4 where it is sensed by the sensor 6, the conveyor 1 stops and the process repeats itself for all the other objects the consumer has purchased. This process continues until such time that the consumer indicates, by pushing a button, for example, that the transaction is ready to be sub-totalled and is ready for tendering.

Figure 5:
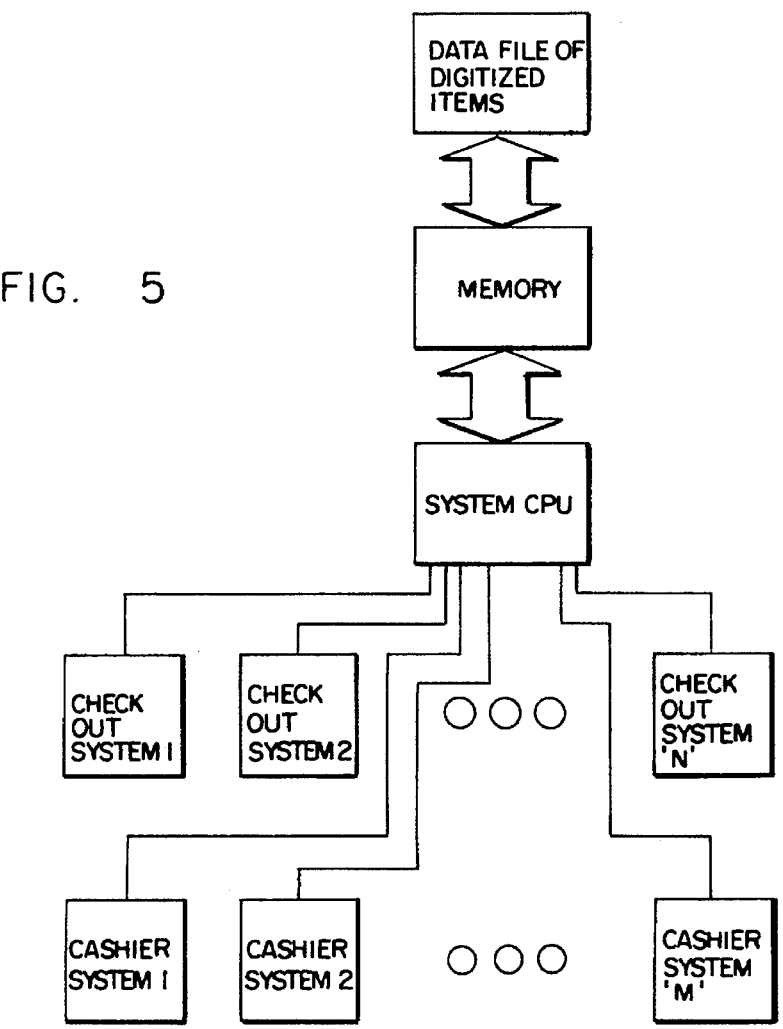
FIG. 5 is a network diagram showing the computerized system utilized as a part of the invention.
Figure 6:
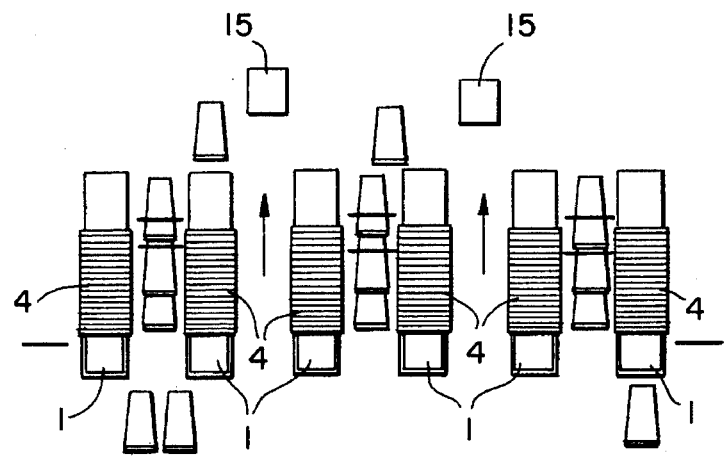
FIG. 6 is a schematic overhead view illustrating the typical arrangement or lay-out of the check-out system embodying the principles of the invention.
Figure 7:
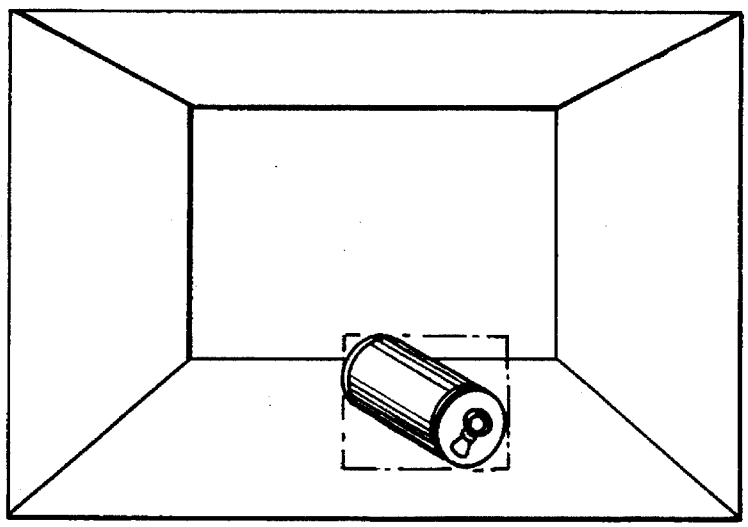
FIG. 7 is a perspective view showing a typical store item positioned at the focal point of the video camera.
Figure 8:
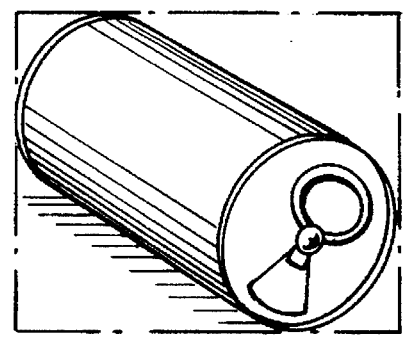
FIG. 8 illustrates the item of FIG. 7 as it would appear in the frame image created by the system of the invention.
Figure 9:
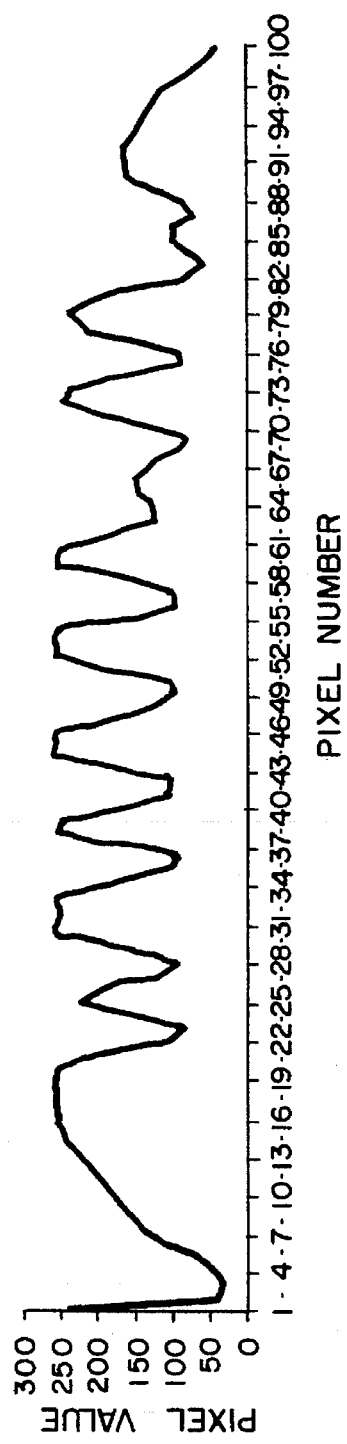
FIG. 9 is a graph depicting the pixel value of each pixel of a typical store item and its characterization in a digitized format.
Figure 10A:
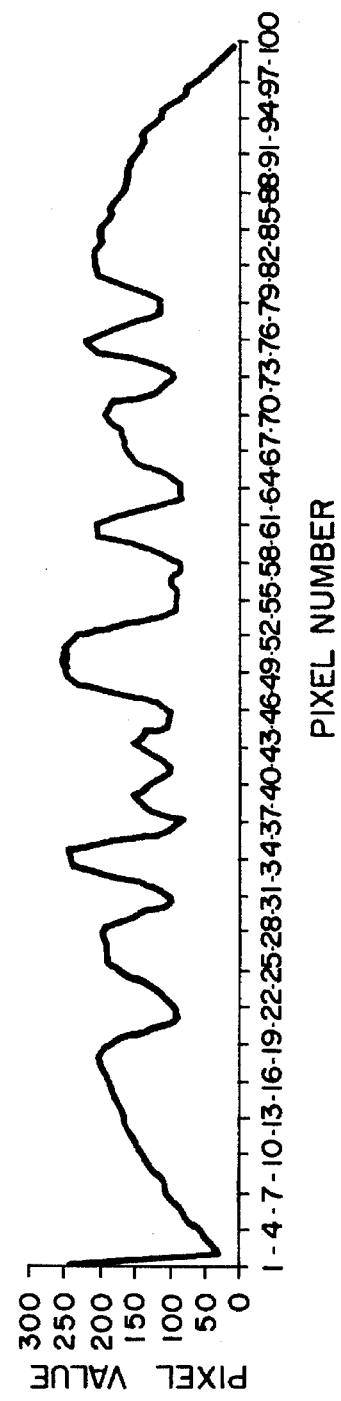
FIG. 10a and 10b are graphs depicting the pixel values of three typical store items and their characterization in a digitized format as would be stored in the store database.
Figure 10B:
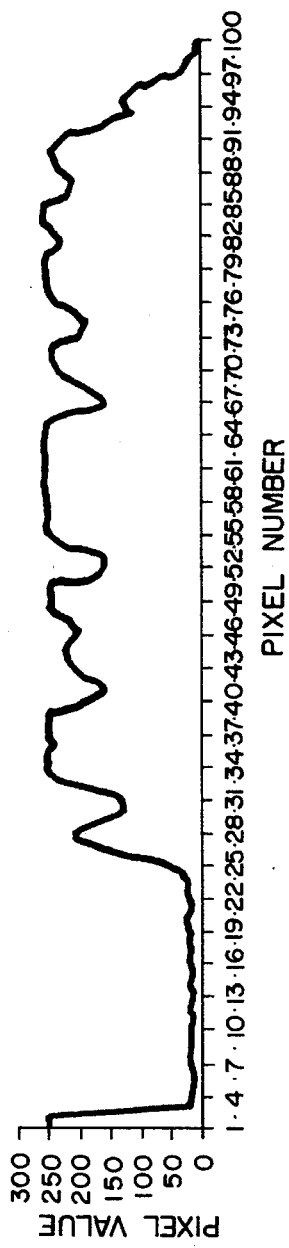

The tendering of the transaction may occur at a cashier's station 15 (FIG. 6) which uses common POS terminals networked to the system CPU, as illustrated in FIG. 5. The cashier's station 15, may include portable terminals, with or without integrated or attached laser scanners, preferably using wireless radio frequency communications, which allow the cashier to move to each checkout lane to tender the transaction as well as to assist each consumer as necessary. Cash drawers located at each checkout lane are activated by the wireless network, thus allowing the cashier to move to those lanes where there are active transactions and thereby increase the efficiency of the operation. Moreover, if an item is not recognized by the system, the cashier can manually intervene and scan the bar code of the unrecognized item using a laser bar code scanner.

An additional embodiment of the invention of the system can be utilized to minimize the number of cashier's stations 15 required in a large operation having a high number of checkout lanes. In this embodiment, the consumer is allowed to tender the transaction using automated electronic payment methods that employ debit cards such as ATM cards, credit cards, etc. If the modifications of this embodiment are employed, payment systems (not shown) would be provided either at the end of each checkout lane or a single system could be provided to serve multiple checkout lanes. In either event, the payment system would include magnetic stripe readers, "pin" pads for the customer to enter his or her "pin" number or for keying other data, and suitable displays and printers. These systems could easily be located in the take away area 14 (FIG. 1). This embodiment would maximize the efficiency of the store operation by entirely removing the need for store personnel in connection with the transaction.

One of the significant features of the invention is that it is a "closed system." As such, it employs a set in which all numbers (subsets) have a match according to the probability that they best meet a series of correlations which are made from the multiple sensing methods disclosed. That is, all objects to be identified (e.g., typical supermarket grocery items) are a subset of a known group of objects (e.g., all items in a supermarket) for which individual identifying characteristics exist, such as size, weight, bar code, digital images at fixed focal length and illumination, and a calculated two-dimensional shape. Given that it is a closed system, by creating a digitized video image of an object and then correlating that digitized image with additional identification characteristics, identification of that object can be quickly made.

A process involving a series of algorithms is used in the invention to compress the data and calculate certain variables for later comparison. For example, the length of the digital record can be set equal to the number of pixels on the CCD array which have a value greater than the background values. By eliminating background data, the record can be shortened dramatically. The resulting length of the record, after the subtraction of background data, substantially reduces the set of total objects that must be searched for a match.

A secondary algorithm, operating on the digital bit record as an "m×n" matrix, can classify the two-dimensional shape of the object. This shape is correlated to other objects in the subset database to further restrict the set of objects that must be searched for a match—such as square, circular, oblong, etc.

A tertiary algorithm sums the values of all the pixels in the subsetted areas to further narrow the set, and additional algorithms may be used for pixel values of the frame image, pixel values of the sum of row values, etc.

A quaternary algorithm searches the further subsetted database of objects looking for a comparison of common pixels for which relevant data has been captured. This can be done, for example, by subtracting pixel values for the corresponding pixels according to their position in the record and according to their bit value. In other words, the records of the subset objects are each compared to the target object record which has been created by the digital image camera 10, and the pixel values are subtracted such that the number of pixel subtractions which equal 0, 1 and 2 are captured. Information regarding the distribution and sum of the data allows further correlation. Theoretically, if the distribution of data are tightly grouped around zero and they sum to zero, the probability that this is the specific item is near one.

As previously explained, as a secondary means of correlation, weight is sensed by a weighing means 12 and correlated with the weight as related from the database of the subset of items, thus further reducing the set.

It will be obvious to those skilled in the art, that magnetic properties, spectral properties, sonar properties, etc., may also be implemented in similar fashion in a particular application so as to reduce the set of objects that must be searched before a match is found.

After the set of possible alternatives has determined a direct match or a small subset of possible matches, the database records for the subset of items are then used as primary information for correlating the "identifying" characteristics, as denoted, which are stored within the known database, as well as calculating additional equations which allow further comparisons.

Secondary checks may be performed after adjusting the focal length of the digital imaging camera or calculating the expected result from such focussing in order to increase the probability of a correct recognition. For example, a certain item may show a specific mark, such as the product name or bar code, and that part of the record is overlaid on the object record.

There are of course some difficult cases where the system is asked to distinguish between items with similar correlations and probability. For example, a can of a particular producer's tomato soup may be identical to a can of the same producer's chicken noodle soup except for the bar code and the words "tomato" or "chicken noodle". Further focusing of the digital imaging camera 10 can be set to a different focal plane to increase the resolution necessary to accurately distinguish "tomato" from "chicken noodle" or to distinguish the bar code of one from the other. This is done by overlaying the digital references of the words or bar code as stored in the database to the currently available record, thereby removing the need to evaluate individual characters or bar/space relationships as practiced on prior art CCD and laser object recognition systems and bar code scanners.

The probability of a match can be further increased in certain cases or an optional check can be made by performing transformations on the records to look for correlations as a function of the transformation of the object record. For example, the records can be rotated 10° according to predicted relationships and checked to see if they match the object record as transformed in the same manner.

If for some reason the system cannot identify a specific item, (for example, because someone accidentally placed two items on the conveyor 1 or if a timer (not shown) is used to indicate that a predetermined amount of time has elapsed for the object identification to take place), the conveyor 1 is started and moves the object(s) to the bagging area. In this case, the digital image can be converted to video and a direct video signal depicting the object is forwarded to the central station along with data, such as the product name, UPC number and video image for the subset of objects from which the object belongs. The cashier or other authorized person, can choose the item in question from the data provided on the subset of items to quickly, easily and accurately resolve the issue rather than requiring manual intervention or direct primary information on the object. This is especially useful for dealing with similar, but undefinable objects caused by lack of information to process all variables. Produce is an example where this is very useful since it may have no bar code and is not of consistent size or weight.

I have described my invention in connection with a preferred embodiment of it, but it will be evident that various revisions and modification can be made to the preferred embodiment disclosed without departing from the spirit and scope of the invention. For example, alternative embodiments of the invention can provide additional electronic imaging cameras to the system if it is determined that multiple images from additional angles in relation to the object as viewed by the primary camera 10 are economically beneficial and increase accuracy to a greater level. This may be important in stores where many objects of similar physical appearance are handled in volume and the system is biased towards special defined characteristics of those objects. Furthermore, laser bar code scanners are another example of a secondary recognition device which can be utilized to increase the probability of correct identification of the system. If used, a laser bar code scanner 16 (see FIG. 1) can be combined with the system in order to enhance the ability of the system to identify random weight items, such as packaged meat, where the size, price and shape vary considerably. Use of a laser bar code scanner reduces the size of the required object database, and because such scanners are relatively low in cost, their use may provide a more efficient solution for identifying these kinds of store items. It is my intention however that all such alternative embodiments and all revisions and variations that would be obvious to those skilled in the art will be included within the scope of the following claims.

What is claimed is as follows:

1. A method for automatically recognizing and identifying, without human intervention, a particular object from a set of unknown objects of different sizes, shapes and pictorial characteristics for purposes of customer billing and inventory control, said method comprising:

providing a computerized data base for storage of object data sets for all objects to be identified, the data sets containing information regarding the size and shape of each object and one or more digitized images of pictorial characteristics of each object from various random orientations by which each object can be recognized and identified by the combination of size, shape and pictorial characteristics;

providing an identification station into which each object to be identified can be introduced without regard to its orientation within the station;

viewing each object at the identification station to capture a digital image of the object;

converting the captured image to a digitized signal;

communicating to the computerized data base the digitized signal of the image captured at the identification station;

comparing the digitized signal of the captured image with the stored object data sets within the computerized data base until the highest correlating combination of size, shape and pictorial characteristics extracted from the digitized signal of the captured image is made with one or more of the object data sets contained within the data base of object data sets; and positively recognizing and identifying the object by said comparison.

2. The method of claim 1 in which the frame scan lines and image scan lines of the digital image are extracted and communicated to the data base and compared with the stored data sets to confirm the object identification.

3. The method of claim 1 in which the pixels of the digital image are extracted and communicated to the data base and compared with the stored data sets to confirm the object identification.

4. The method of claim 1 in which the information contained in the object data sets of the data base also includes the weight of each object to be identified, and at the identification station the weight of the object is measured, and the measured weight is converted to a digitized signal that is communicated to the data base so as to reduce the number of stored object data sets that are compared to positively recognize and identify the object.

5. The method of claim 1 in which the object identification data is stored and periodically communicated to a main processing unit for use in billing and inventory control.

6. A method for the automated check-out registering and inventory of objects sold to customers at a sales outlet which method provides for recognition, identification, differentiation and comparison of individual unknown objects at multiple check-out stations within the outlet without human intervention, said method comprising the steps of:

storing multiple object identification signals in a central data base, each identification signal pertaining to a physical characteristic of one of the individual objects offered for sale within the sales outlet, the characteristics including the size, shape and pictorial characteristics of each object;

providing at each check-out station an object identification station;

moving each object to be recognized and identified into the object identification station;

capturing an image of each object regardless of its orientation within the object identification station;

moving the object out of the identification station once the image is captured;

converting the captured image into an electronic signal that represents the size, shape and pictorial characteristics of the object;

communicating the electronic signal to the central data base;

comparing the electronic signal with the object identification signals stored in the data base until a match is made and the recognition and identification of the object determined;

communicating the known identification of the object to a processor where it is stored and price information assigned to the identified object; and continuing the identification of all objects to be identified for a particular customer.

7. The method of claim 6 in which the stored multiple object identification signals in the central data base include a signal pertaining to the weight of each object to be identified and at the object identification station the weight of the object is also determined as the object is stopped, and the weight information is converted to a signal and communicated to the central data base, the signal representing the weight being used to the object.

8. The method of claim 7 further comprising the steps of:

providing a memory for the storage of received object identification signals; and periodically communicating said stored identification signals to a central processor for use in the control of inventory of the objects in the sales outlet.

9. A retail store check-out registration and inventory identification system for recognizing and identifying unknown objects sold to customers of the store, said system comprising:

a central processing unit including memory means for the storage of preestablished object identification data including data sets for all the objects of the store, each object data set providing identification data corresponding to a separate object for sale within the store being serviced by the automated check-out system and including object data sets representing the size, shape and pictorial characteristics of each object from different orientations by which each object can be recognized and identified;

a plurality of customer check-out stations, each station having:

a display screen providing for the display of operative instructions to the customer utilizing the check-out station;

an object identification station;

digital video imaging means combined with the identification station for capturing an optical image of an object in the station regardless of the orientation of the object within the identification station;

transport means to move an object into the object identification station for purposes of imaging;

a first sensor combined with the object transport means to stop said transport means when an object enters the identification station and to activate the video imaging means;

means for digitizing of the electronic signal produced by the video imaging means and which represents the size, shape and pictorial characteristics of an object in the identification station;

means for communicating the digitized signal to the central processing unit;

means for comparing the digitized signal representing the object data received from each check-out station with the object identification data sets stored within said central processing unit to recognize and identify the object and register its identity in the memory; and means for correlating the multiple electronic object identification signals received from a check-out station for a particular customer.

10. The system of claim 9 in which each multiple electronic object identification signal received from a check-out station for a particular customer is converted to a per object price, a cashier station is provided for customer payment for the objects registered in the memory, and means is provided for communicating the information regarding object price to the cashier station.

11. The system of claim 9 in which each object data set includes a digitized signal representing the weight of each object of the store and each object identification station also includes object weight determination means for weighing each object in the station, and means for converting said weight information to a digitized signal and communicating said signal to the processing unit so as to reduce the number of stored object data sets that are compared to positively recognize and identify the object also being identified by the video imaging means.

12. The system of claim 9 in which the primary identification means is the optical-image based digitized signal.

13. The system of claim 12 in which the secondary identification means is the data of the digitized representation of the object data set.

14. The system of claim 13 in which there is a tertiary identification means including pictorial images of the object captured by the digital video imaging means, means for converting said pictorial images to electronic signals, and means for comparing said signals to electronically stored pictorial images of the objects in the central processing unit.

15. The system of claim 14 in which said pictorial images include the image for the universal product code (UPC) of the object in the identification station and by which the object can be identified by utilizing algorithms measuring the relation to the size and spacing of bars and spaces.

16. The system of claim 14 in which said pictorial images include the image for the UPC of the object in the identification station and by which the object can be identified by comparing the digitized representation of the UPC with stored data sets of the UPCs within the central processing unit.

17. The system of claim 9 in which there is means combined with each of the check-out stations providing for the multiple communication of electronic data and simultaneous computerized analysis of the data in making object identification determinations.

18. The system of claim 10 in which the central processing unit includes means providing for communication between the multiple check-out stations, the cashier's station and the central processing unit in addition to the memory means for storage of the object identification data.

19. The system of claim 18 in which the cashier's station includes a portable terminal for communicating with the central processing unit.

20. The system of claim 9 in which the check-out stations are combined with a customer-operated automated electronic payment system providing for the payment of the transaction using the customer's electronic debit card.

* * * * *